United States Patent Office 3,297,140
Patented Jan. 10, 1967

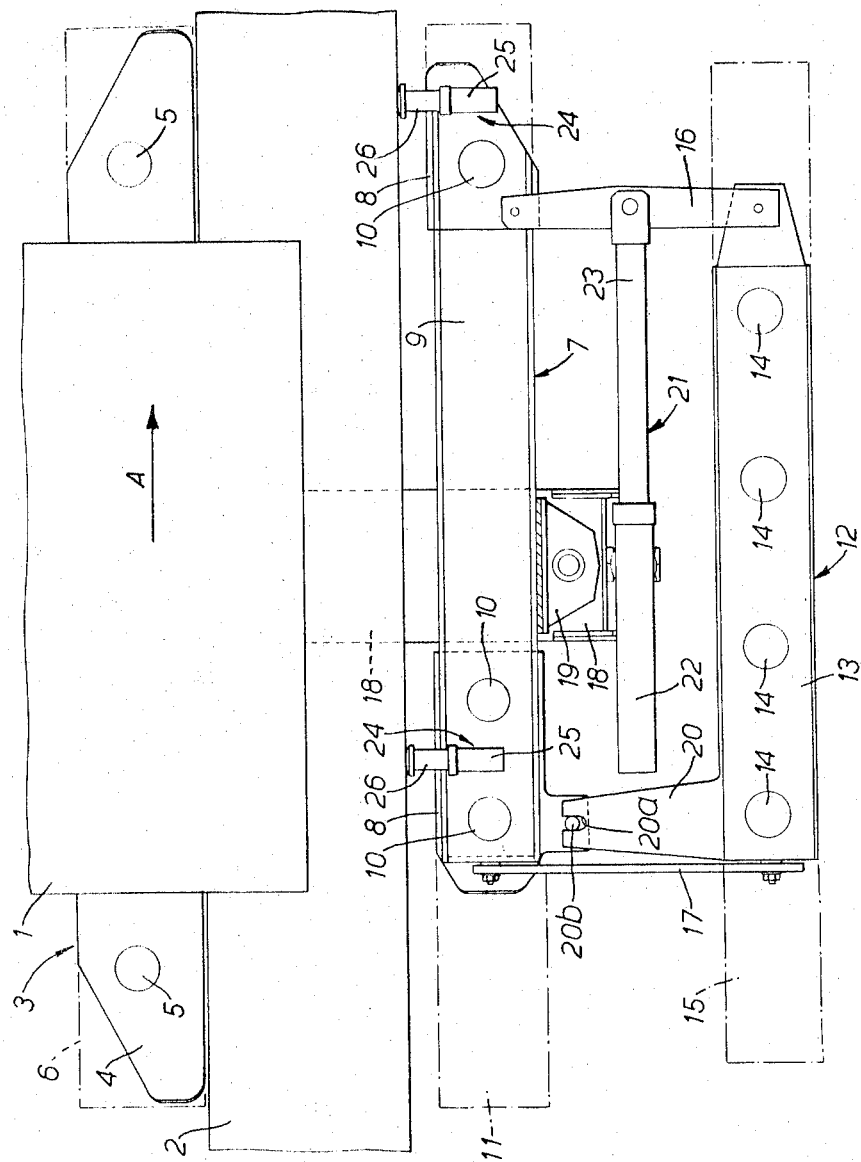

3,297,140
CONVEYOR ANCHORING AND ADVANCING APPARATUS
Dennis Henry Cannon, St. Marks, and Richard John Hollis and Michael Charles Potts, Prestbury, England, assignors to Dowty Mining Equipment Limited, Tewkesbury, England, a British company
Filed Feb. 25, 1965, Ser. No. 435,133
Claims priority, application Great Britain, Feb. 27, 1964, 8,230/64
9 Claims. (Cl. 198—88)

This invention relates to apparatus for anchoring and advancing a conveyor which extends along the working face of a mine, for example a coalmine.

The present invention provides conveyor advancing and anchoring apparatus including a first conveyor extending along the working face of a mine, a second conveyor located adjacent one end portion of the first conveyor for receiving mined material from the first conveyor and conveying the mined material in a direction transverse to the direction in which the first conveyor conveys the mined material (usually substantially perpendicular thereto), a frame located on the opposite side of the second conveyor to the first conveyor and having at least one fluid-pressure-operated prop operable to wedge the frame between the roof and floor, a member secured to the end portion of the first conveyor and extending beneath the conveying element of the second conveyor, the member being movable relative to and guided by the frame, and a fluid-pressure-operated advancing jack operable to cause relative movement in a direction substantially perpendicular to the working face between the member and the end portion of the first conveyor on the one hand and the frame on the other hand.

The apparatus may include one or more fluid-pressure-operated steering jacks operable to move the frame relatively to the second conveyor in a direction substantially parallel to the working face.

The apparatus may include a second frame spaced from the first frame on the opposite side of the first frame to the second conveyor, the second frame having at least one fluid-pressure-operated prop operable to wedge the second frame between the roof and floor and being connected to the first frame by cross-pieces, and the advancing jack being secured to one of the cross-pieces and to the member.

The apparatus may also include a third frame located on the same side of the second conveyor as the first conveyor and being secured to the end portion of the first conveyor, the third frame having at least one fluid-pressure-operated prop operable to wedge the frame between the roof and floor.

In mining apparatus of the type which this invention concerns, the first conveyor collects the coal as it is dislodged from the working face by a cutter, and transports it to a roadway, where it is delivered to the second conveyor for transportation in a direction transverse to the first conveyor. The cutter, which is guided along the first conveyor, must advance towards the working face after a traverse, in order to remove material during a second traverse, and its guide, the first conveyor, must also advance. This is accomplished, and the newly cut roof is supported, by advancing means of known construction, operating first to advance the first conveyor, in the portion behind the cutter, and then to advance the individual roof supports. It is necessary to advance the delivery end of the first conveyor lengthwise of the second conveyor, as the remainder of the first conveyor is advanced, and to keep the first conveyor correctly oriented relative to the second conveyor, in order to insure delivery of material from the first onto the second conveyor. Unless this advance of the delivery end of the first conveyor is properly effected, it may not function correctly as a guide for the cutter. The present invention provides means to effect advance of that delivery end, and to maintain correct relative orientation of the two conveyors.

One embodiment of the invention will now be described, by way of example, with reference to the accompanying drawing which shows a diagrammatic plan view of conveyor advancing and anchoring apparatus.

With reference to the accompanying drawing, conveyor advancing and anchoring apparatus includes a first conveyor 1 which extends along the working face of a mine, and which must be advanced (to the right in the drawing) from time to time. A second conveyor 2 is located in a roadway at the end of the working face and adjacent one end portion of the face conveyor 1. The roadway conveyor 2 receives mined material from the face conveyor 1 and conveys the mined material along the roadway, normally in a direction substantially perpendicular to the direction in which the face conveyor 1 conveys the mined material. The direction in which the working face is advancing is shown by arrow A. The face conveyor 1, in known manner, includes a series of articulated sections which are advanced in the manner known as snaking by conveyor-advancing devices (not shown) located along the working face. This invention is not concerned with the means to effect advance of the conveyor generally, but rather with the anchoring and advancing apparatus for an end portion of the face conveyor 1.

A frame 3 is located on the same side of the roadway conveyor 2 as the face conveyor 1. The frame 3 includes a floor-engaging member 4 carrying two fluid-pressure-operated props 5, which carry a roof-engageable member 6 (shown only in dot-dash lines). The props 5 can be extended to force the floor-engaging member 4 against the floor and the roof-engageable member 6 against the roof, thereby wedging the frame 3 between the roof and floor of the mine. The floor-engaging member 4 is secured to the main body of the face conveyor 1 and extends in a direction parallel to the roadway, as also does the roof-engageable member 6. The props 5 are located one on each side of the face conveyor 1. The frame 3 or the end portion of the conveyor 1 may carry means for driving the face conveyor 1.

A frame 7 is located on the opposite side of the roadway conveyor 2 to the face conveyor 1, and lies parallel with the frame 3. The frame 7 includes two spaced footings or floor-engaging members 8 connected by a bridge portion 9 which is raised above the floor. The rear floor-engaging member 8 carries one or more fluid-pressure-operated props 10 (two, as shown), and the front floor-engaging member 8 may carry only a single fluid-pressure-operated prop 10. The three props 10 carry roof-engageable member 11.

A frame 12 which is parallel to the frames 3, 7 lies on the opposite side of the frame 7 to the roadway conveyor 2. The frame 12 is spaced from the frame 7 and includes a floor-engaging member 13 carrying several, for example, four, fluid-pressure-operated props 14, which carry a roof-engageable member 15.

The front end portions of floor-engaging members 8, 13 of frames 7, 12 are connected by a cross-piece 16 which is pivotally connected to each floor-engaging member 8, 13. The rear end portions of floor-engaging members 8, 13 are connected by a cross-piece 17 which is also pivotally connected to each floor-engaging member 8, 13. A further cross-piece 20 carried by the floor-engaging member 13 has a slot 20a in which a pin 20b, carried by the floor-engaging member 8 is located. The cross-pieces 17, 20 and 16 allow some relative movement between the floor-engaging members 9 and 13 to cater for irregularities in the floor, while ensuring that the two frames 7 and 12 advance together.

A connecting member 18 secured to the main body of the end portion of the face conveyor 1 extends beneath the conveying element of the roadway conveyor 2 and beneath the bridge portion 9 of the frame 7. A slide 19 pivotally carried by the end portion of the connecting member 18 on the opposite side of the bridge portion 9 to the face conveyor 1 bears against the bridge portion 9.

A fluid-pressure-operated advancing jack 21 located between frames 7 and 12 has its cylinder 22 pivotally secured to the connecting member 18 and its piston rod 23 pivotally secured to the cross-piece 16. Each floor-engaging member 8 of frame 7 carries a fluid-pressure-operated steering jack 24, the cylinder 25 of which is secured to its floor-engaging member 8 and the piston rod 26 of which is engageable with, but not connected to, the roadway conveyor 2.

While mined material is being conveyed along the working face by the face conveyor 1 and then transferred to the roadway conveyor 2, all three frames 3, 7, and 12 are wedged between the roof and floor by their props 5, 10 and 14 respectively. The end portion of the face conveyor 1 is thus prevented from movement in any direction, and in particular is prevented from slipping along the working face by all three frames since the slide 19 bears against the bridge portion 9 of the frame 7. The two steering jacks 26 and the advancing jack 21 are not energised at this stage.

When it is required to advance the end portion of the face conveyor 1, the props 5 of the frame 3 are released, and the advancing jack 21, reacting from the still-anchored frame 7 and 12, by contraction advances frame 3 to the right; see arrow A. As the end portion of the face conveyor 1 and the frame 3 are advanced the slide 19 is guided by the bridge portion 9 of the frame 7. At the end of the advance of the end portion of the face conveyor 1, the props 5 are reset.

The props 10 and 14 of the frames 7 and 12 respectively are then released, and the frames 7 and 12 are advanced by extending the advancing jack 21. The connecting member 18, face conveyor 1 and frame 3 now act as anchorages. During this advance, the steering jacks 26 are operated either simultaneously or alternatively to steer the frames 7 and 12 relative to the roadway conveyor 2 to correct any misalignment which may have occurred. At the end of the advance of the frames 7 and 12, the props 10 and 14 are reset.

Each time the end portion of the face conveyor 1 is advanced, it is steered along a preset path defined by the bridge portion 9 which acts upon the slide 19, this preset path having been set by appropriate operation of the steering jacks 26 during the previous advance of the frames 7 and 12.

We claim as our invention:

1. Mechanism to anchor and alternatively to advance an end of a first conveyor that in use extends along the working face of a mine, said mechanism including, in addition to the first conveyor and releasable prop means operable to anchor the first conveyor in a given position, a second conveyor disposed adjacent the end of said first conveyor in position to receive mined material from and to convey the same in a direction transverse to the first conveyor, a frame located adjacent the second conveyor, fluid-pressure-operated prop means carried by said frame and operable to wedge the frame between the mine roof and floor, fluid-pressure-operated advancing jack means operatively interconnecting said frame and the end of the first conveyor to shift each, upon release of its respective prop means, relative to the other in the direction of the second conveyor, and guiding means operatively connected to the end of the first conveyor and guided by the frame in the direction lengthwise of the second conveyor, to control the direction of their respective advances.

2. Mechanism as set forth in claim 1, wherein the frame is located at the side of the second conveyor opposite the first conveyor, the interconnecting means including a connecting member carried by the end of the first conveyor and extending towards said frame, the advancing jack means being secured to said connecting member and to the frame, and said guiding means engaging the frame at the side opposite the first conveyor, for guidance along the frame during shifting.

3. Apparatus according to claim 2 including a second frame spaced from the first frame on the opposite side of the first frame to the second conveyor, the second frame having at least one fluid-pressure-operated prop operable to wedge the second frame between the roof and floor interconnecting the two frames, and the advancing jack being secured to one of the cross-pieces and to the connecting member.

4. Apparatus according to claim 3 including a third frame located on the same side of the second conveyor as the first conveyor and being secured to the end portion of the first conveyor, the third frame having at least one fluid-pressure-operated prop operable to wedge the frame between the roof and floor.

5. Apparatus according to claim 1 wherein the guiding means include at least one fluid-pressure operated steering jack operable to move the frame relatively to the second conveyor in a direction substantially parallel to the working face.

6. Conveyor advancing and anchoring apparatus including a first conveyor that in use extends along the working face of a mine, releasable means to anchor said first conveyor in place, a second conveyor located adjacent the delivery end of the first conveyor for receiving material from the first conveyor and conveying it in a direction transverse to the first conveyor, an advanceable frame means located on the opposite side of the second conveyor to the first conveyor, prop means operable to wedge the frame means between the roof and the floor of the mine, extensible and contractable jack means operatively connected at its one end to said frame means, means operatively connected to said first conveyor and to the other end of said jack means, and guided by said frame means for movement along the second conveyor, whereby contraction of the jack means during release of said anchoring means will effect movement of the first conveyor lengthwise of the second conveyor, or alternatively extension of the jack means during release of said prop means will effect movement of the frame means lengthwise of the second conveyor.

7. Conveyor advancing and anchoring apparatus as in claim 6, including a second frame means supporting and advanceable with the first conveyor, the anchoring means including prop means independent a second of the first prop means for wedging the first-mentioned frame means, whereby to wedge the second frame means between the roof and the floor, whereby release of the first prop means and contraction of the jack means will effect advance of the first conveyor by reaction from the first-mentioned frame means, and alternatively release of the second prop means and extension of the jack means will effect advance of the first-mentioned frame means by reaction from the second frame means.

8. Conveyor advancing and anchoring apparatus as in claim 6, wherein the operative connection between the first conveyor and the jack means includes a pivot, whereby the jack means may swing relative to the first conveyor, and steering means intermediate the advanceable frame means and the second conveyor, to direct the advance of the frame means along a predetermined line.

9. Conveyor advancing and anchoring apparatus as in claim 6, wherein the frame means includes two elements spaced apart and extending generally parallel to the second conveyor, and means flexibly joining said two elements for conjoint advance but for independent adjustment to irregularities of the mine surfaces.

No references cited.

ANDRES H. NIELSEN, *Primary Examiner.*

EVON C. BLUNK, *Examiner.*

R. E. AEGERTER, *Assistant Examiner.*